(12) United States Patent
Abe (10) Patent No.: US 12,299,510 B2
(45) Date of Patent: May 13, 2025

(54) PRINTER FOR USE WITH ATTACHING DEVICE (71) Applicant: SATO HOLDINGS KABUSHIKI KAISHA, Tokyo (JP)

(72) Inventor: Toshiaki Abe, Minato-ku (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/289,941

(22) PCT Filed: May 27, 2022

(86) PCT No.: PCT/JP2022/021779
§ 371 (c)(1),
(2) Date: Nov. 8, 2023

(87) PCT Pub. No.: WO2023/127178
PCT Pub. Date: Jul. 6, 2023

(65) Prior Publication Data
US 2024/0249096 A1 Jul. 25, 2024

(30) Foreign Application Priority Data
Dec. 27, 2021 (JP) ................................. 2021-212465

(51) Int. Cl.
G06K 15/00 (2006.01)
G06K 15/02 (2006.01)

(52) U.S. Cl.
CPC ......... *G06K 15/402* (2013.01); *G06K 15/024* (2013.01); *G06K 15/404* (2013.01); *G06K 15/028* (2013.01); *G06K 2215/0097* (2013.01)

(58) Field of Classification Search
CPC .. G06K 15/402; G06K 15/024; G06K 15/404; G06K 15/028; G06K 2215/0097
See application file for complete search history.

(56) References Cited

U.S. PATENT DOCUMENTS

| 2011/0199630 A1* | 8/2011 | Oozawa ................. B41J 3/4075 358/1.14 |
| 2014/0253936 A1* | 9/2014 | Mizuguchi ............ G06F 3/1285 358/1.13 |
| 2015/0022845 A1* | 1/2015 | Roscoe ................. G06F 3/1234 358/1.14 |

(Continued)

FOREIGN PATENT DOCUMENTS

| JP | H06-210911 A | 8/1994 |
| JP | 2001-150734 A | 6/2001 |

(Continued)

*Primary Examiner* — Nicholas Pachol
(74) *Attorney, Agent, or Firm* — Foley & Lardner LLP (57) ABSTRACT To provide a printing system including an attaching device configured to attach a label on an adherend, and a printer connected to the attaching device and configured to operate in cooperation with the attaching device, in which the printer is configured to send a signal for indicating a state of the printer to the attaching device, and/or receive a signal for performing an operation of the printer from the attaching device, and the attaching device is configured to receive and display the signal for indicating the state of the printer, and/or receive an input of the signal for performing the operation of the printer and send the signal to the printer.

14 Claims, 5 Drawing Sheets (56) References Cited

U.S. PATENT DOCUMENTS

| | | | |
|---|---|---|---|
| 2015/0262044 A1* | 9/2015 | Sochi | G06K 15/1857 |
| | | | 358/1.15 |
| 2016/0292541 A1* | 10/2016 | Yasui | G05B 15/02 |
| 2017/0087909 A1 | 3/2017 | Mochizuki | |
| 2018/0052644 A1* | 2/2018 | Aoki | G06F 3/1208 |
| 2018/0115656 A1* | 4/2018 | Noda | G06K 15/1806 |
| 2018/0330209 A1* | 11/2018 | Ooba | G06K 15/1809 |
| 2019/0023028 A1* | 1/2019 | Kawaguti | B41J 11/003 |
| 2019/0065129 A1* | 2/2019 | De Groot | G06F 3/1203 |
| 2019/0187948 A1* | 6/2019 | Dommaraju | H04N 1/00037 |
| 2019/0196764 A1* | 6/2019 | Furukawa | G06F 3/121 |
| 2020/0307253 A1* | 10/2020 | Kawaguti | G06F 3/1234 |
| 2020/0371722 A1* | 11/2020 | Sato | G06F 3/1204 |
| 2021/0096789 A1* | 4/2021 | Goda | H04N 1/32128 |
| 2023/0418533 A1* | 12/2023 | Nakazato | B41J 3/4078 |

FOREIGN PATENT DOCUMENTS

| | | |
|---|---|---|
| JP | 2008-213896 A | 9/2008 |
| JP | 2015-063314 A | 4/2015 |
| JP | 2015-223705 A | 12/2015 |
| JP | 2017-024221 A | 2/2017 |
| JP | 2018-115014 A | 7/2018 |
| JP | 2018-154352 A | 10/2018 |
| JP | 2021-068260 A | 4/2021 |

* cited by examiner

| NUMBER | | SIGNAL NAME *3 | CONTENT | INPUT/OUTPUT | LEVEL | ELECTRIC CONDITION VOLTAGE, CURRENT (MAX) |
|---|---|---|---|---|---|---|
| 25 PINS | 14 PINS | | | | | |
| 1 | 14 | FG | FRAME GROUND | - | - | - |
| 2 | - | +5 V | POWER SUPPLY | - | - | 600 mA |
| 3 | - | PRINTING START POSITION SIGNAL (HOME POSITION) | COMPLETION OF BACKFEED | OUTPUT | LOW | 400 V 800 mA |
| 4 | 4 | MACHINE ERROR | OCCURRENCE OF COVER OPEN, HEAD ERROR, COMMUNICATION ERROR, OR THE LIKE | OUTPUT | LOW | 400 V 80 mA |
| 5 | 6 | PRINTING COMPLETION SIGNAL (PREND) | COMPLETION OF OPERATION TO ISSUE ONE LABEL | OUTPUT | LOW | 400 V 80 mA |
| 6 | 9 | PRINTABLE SIGNAL | WHEN PRINTING DATA EXISTS | OUTPUT | HIGH | 400 V 80 mA |
| 7 | - | LABEL-NEAR-END | WHEN LABEL IS NEARING END | INPUT | LOW | HIGH: HIGH IMPEDANCE LOW: -5 mA OR MORE, 0 V |
| 8 | 7 | REISSUE (PRIN2) | REISSUE WITH THE SAME PRINTING CONTENT | INPUT | LOW | HIGH: HIGH IMPEDANCE LOW: -5 mA OR MORE, 0 V |
| 9 | - | BACKFEED COMMAND (DISPENSE IN) | START OF BACKFEED | INPUT | LOW | HIGH: HIGH IMPEDANCE LOW: -5 mA OR MORE, ON |
| 10 | - | PRELIMINARY | PRELIMINARY | INPUT | - | HIGH: HIGH IMPEDANCE LOW: -5 mA OR MORE, ON |
| 11 | - | OUT_COM | GROUND OF EXTERNAL DEVICE | - | - | - |
| 12 | 13 | +5 V | POWER SUPPLY | - | - | 600 mA |
| 13 | 12 | +24 V | POWER SUPPLY | - | - | 2 A |
| 14 | 2 | GND | SIGNAL GROUND | - | - | - |
| 15 | 2 | OUT_COM | GROUND OF EXTERNAL DEVICE | - | - | - |
| 16 | 3 | RIBBON END | DETECT END OF INK RIBBON | OUTPUT | LOW | 400 V 80 mA |
| 17 | 1 | PAPER END | DETECT END OF LABEL | OUTPUT | LOW | 400 V 80 mA |
| 18 | 10 | RIBBON-NEAR-END | DETECT END PORTION OF LABEL | OUTPUT | HIGH | 400 V 80 mA |
| 19 | - | PRELIMINARY | PRELIMINARY | OUTPUT | - | 400 V 80 mA |
| 20 | 5 | PRINTING START (PRIN) | ISSUING OF LABEL | INPUT | LOW | HIGH: HIGH IMPEDANCE LOW: -5 mA OR MORE, 0 V |
| 21 | 11 | FEED | CONVEYANCE OF LABEL | INPUT | LOW | HIGH: HIGH IMPEDANCE LOW: -5 mA OR MORE, 0 V |
| 22 | - | PRELIMINARY | PRELIMINARY | INPUT | - | HIGH: HIGH IMPEDANCE LOW: -5 mA OR MORE, ON |
| 23 | - | PRELIMINARY | PRELIMINARY | INPUT | - | HIGH: HIGH IMPEDANCE LOW: -5 mA OR MORE, ON |
| 24 | 13 | IN_COM *1 | FOR POWER SUPPLY FROM EXTERNAL DEVICE | INPUT | - | 5 V TO 24 V OR GND |
| 25 | - | GND | SIGNAL GROUND | - | - | - |

FIG. 5

PRINTER FOR USE WITH ATTACHING DEVICE

TECHNICAL FIELD

The present invention relates to a printing system, a printing system control method, a printer, and a program.

BACKGROUND ART

JP 2021-68260 A discloses a system in which various devices such as a printer, a label attaching device, and a boxing device cooperate with each other to attach a label to a product and package the product.

SUMMARY OF INVENTION

The system as disclosed in JP 2021-68260 A is assembled using independent devices. Therefore, interfaces of a display portion, an input portion, and the like provided for each device cause confusion to a user.

In addition, depending on a layout of each device in the system, it may be difficult to arrange the display portion and the input portion of each device such that the user can handle the portions in an integrated manner, which leads to a decrease in work efficiency.

The present invention has been made in view of such technical problems, and an object of the present invention is to improve user convenience when a printer is used together with a device capable of performing a cooperative operation.

According to an aspect of the present invention, there is provided a printing system including an attaching device configured to attach a label on an adherend, and a printer connected to the attaching device and configured to operate in cooperation with the attaching device, in which the printer is configured to send a signal for indicating a state of the printer to the attaching device, and/or receive a signal for performing an operation of the printer from the attaching device, and the attaching device is configured to receive and display the signal for indicating the state of the printer from the printer, and/or receive an input of the signal for performing the operation of the printer and send the signal to the printer.

According to the aspect of the present invention, it is possible to improve user convenience when a printer is used together with a device capable of performing a cooperative operation.

BRIEF DESCRIPTION OF DRAWINGS

FIG. 5 is a diagram illustrating examples of commands corresponding to input and output terminals of a digital I/O portion.

DESCRIPTION OF EMBODIMENTS

[Description of Printing System]

Hereinafter, a printing system 100 according to an embodiment will be described with reference to the accompanying drawings.

Figure 1:
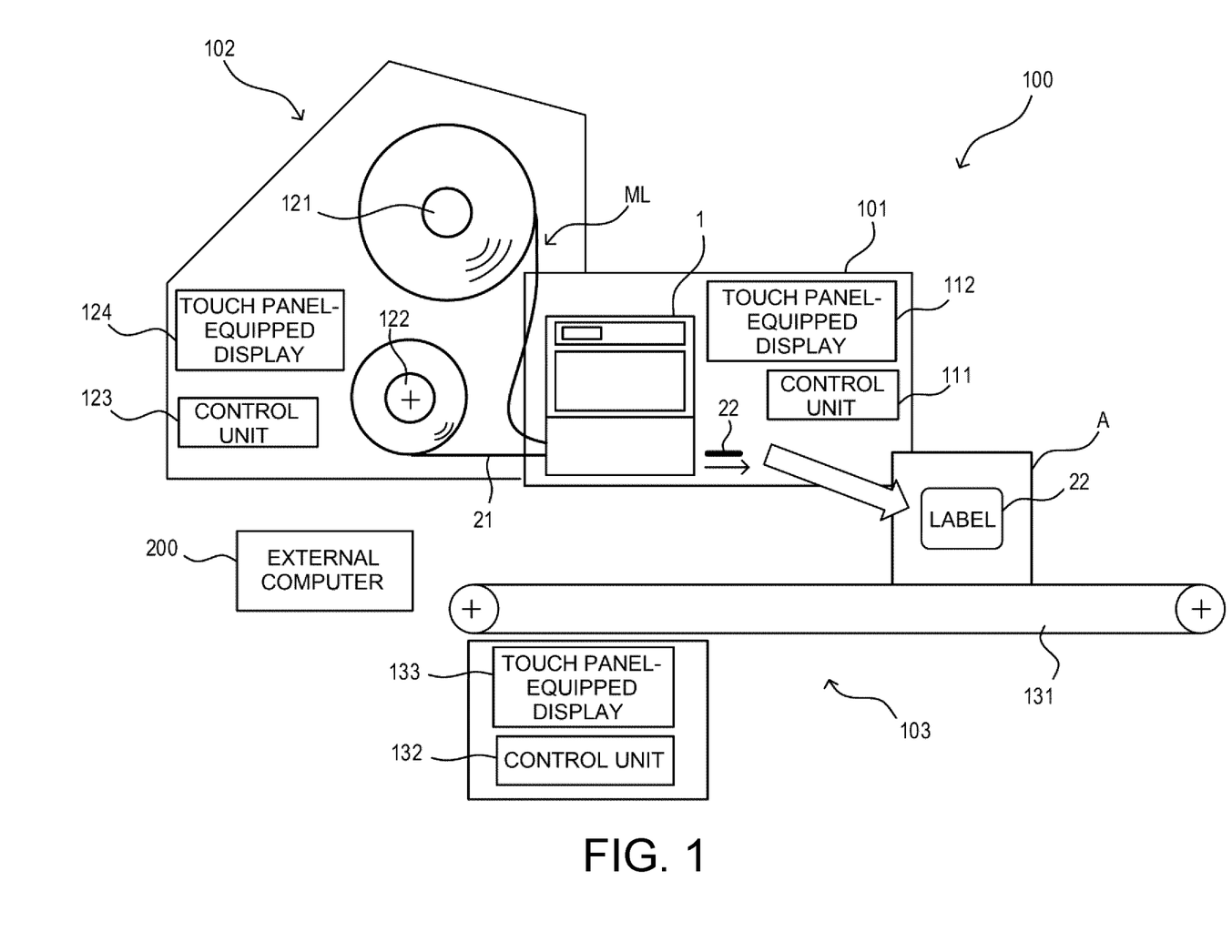
FIG. 1 is a schematic diagram of a printing system to which a printer according to an embodiment of the present invention is applied.

FIG. 1 is a schematic diagram of the printing system 100 according to the present embodiment.

The printing system 100 includes a printer 1 that performs printing on a label, and a label attaching machine 101 as an attaching device that attaches a label 22 printed by the printer 1 to an adherend A.

The printing system 100 further includes a label feeding machine 102 that feeds the label to the printer 1 and a conveyance device 103 that conveys the adherend A.

The printer 1, the label attaching machine 101, the label feeding machine 102, and the conveyance device 103 are communicably connected to each other via an external computer 200.

In the present embodiment, the printer 1 is supplied with a label continuous body ML including a plurality of labels 22 on a long liner sheet 21 from the label feeding machine 102 and performs printing on the label 22. The printer 1 is used by being attached to the label attaching machine 101.

The label attaching machine 101 includes various configurations (not shown) for receiving the printed label 22 from the printer 1 and performing an operation of attaching the printed label 22 to the adherend A conveyed by the conveyance device 103, and a control unit 111 that controls these configurations.

The label attaching machine 101 includes a touch panel-equipped display 112 by which an operation input to the printer 1 and the label feeding machine 102 and display are performed.

Figure 4:
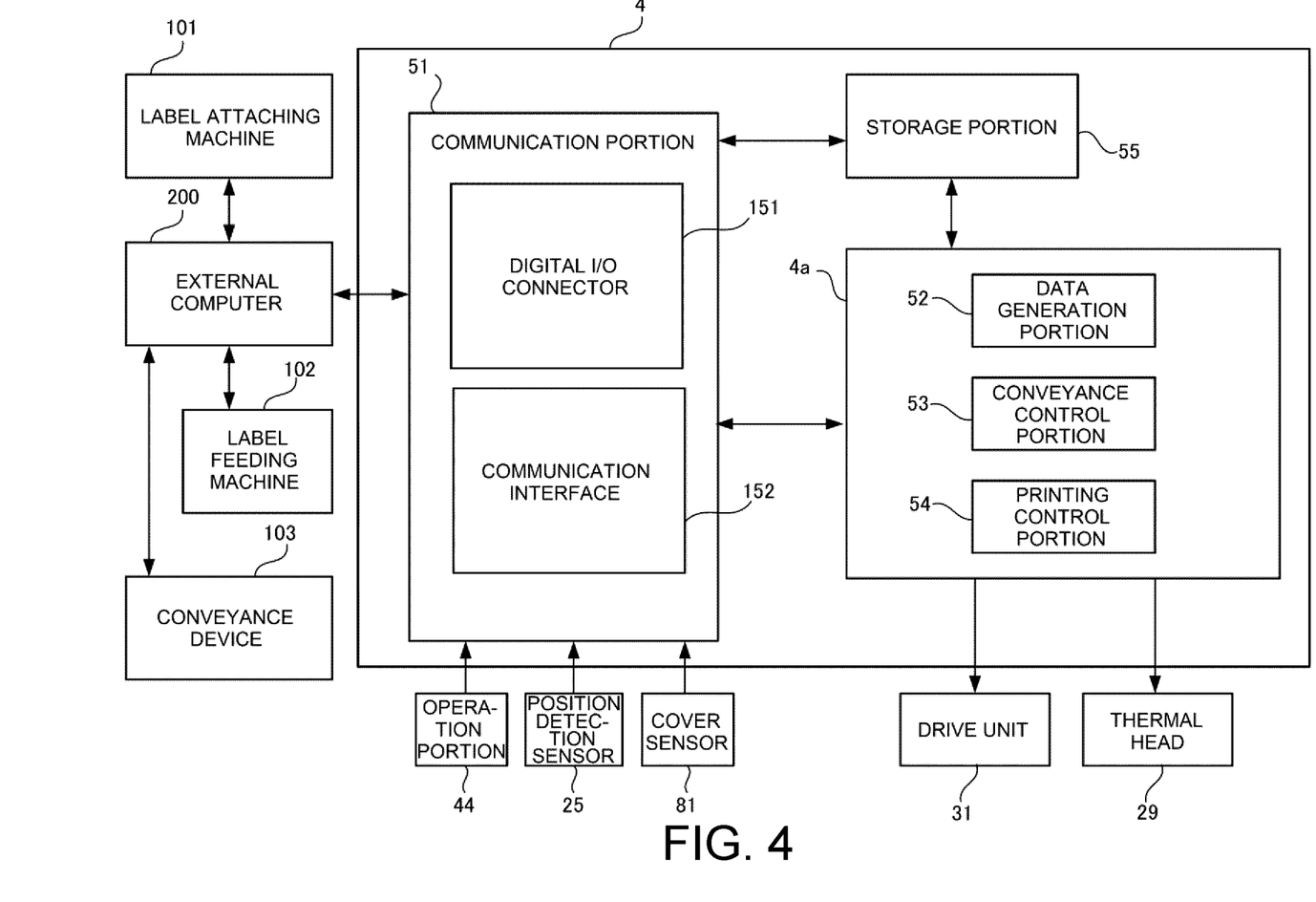
FIG. 4 is a functional block diagram of a control unit.

In the label attaching machine 101, the control unit 111 is connected to the external computer 200 via an interface (not shown) (see FIG. 4).

The label feeding machine 102 includes a supply shaft 121 that supplies the label continuous body ML to the printer 1, a winding shaft 122 that winds up the liner sheet 21 after the label 22 is peeled off from the label continuous body ML, and a control unit 123 that performs control of feeding out the label continuous body from the supply shaft 121 by a predetermined feeding out amount.

The label feeding machine 102 includes a touch panel-equipped display 124 that serves both as an input portion by which an operation input to the printer 1 and the label feeding machine 102 is performed, and a display portion for displaying information related to an error notification or an operation.

In the label feeding machine 102, the control unit 123 is connected to the external computer 200 via an interface (not shown) (see FIG. 4).

In the printing system 100, the printer 1 described above sends a signal for indicating a state of the printer 1 to the label attaching machine 101, and/or receives a signal for performing an operation of the printer 1 from the label attaching machine 101. The label attaching machine 101 described above receives and displays the signal for indicating the state of the printer 1 from the printer 1, and/or receives an input of the signal for performing the operation of the printer 1 and sends the signal to the printer 1.

The conveyance device 103 includes a conveyance portion 131 that conveys the adherend A to which the label 22 is to be attached, and a control unit 132 that controls conveyance of the adherend A. In addition, a touch panel-equipped display 133 by which an operation input to the conveyance device 103 and display are performed.

In the conveyance device 103, the control unit 132 is connected to the external computer 200 via an interface (not shown) (see FIG. 4).

[Description of Printer]

Hereinafter, the printer 1 according to the present embodiment will be described with reference to the accompanying drawings.

Figure 2:
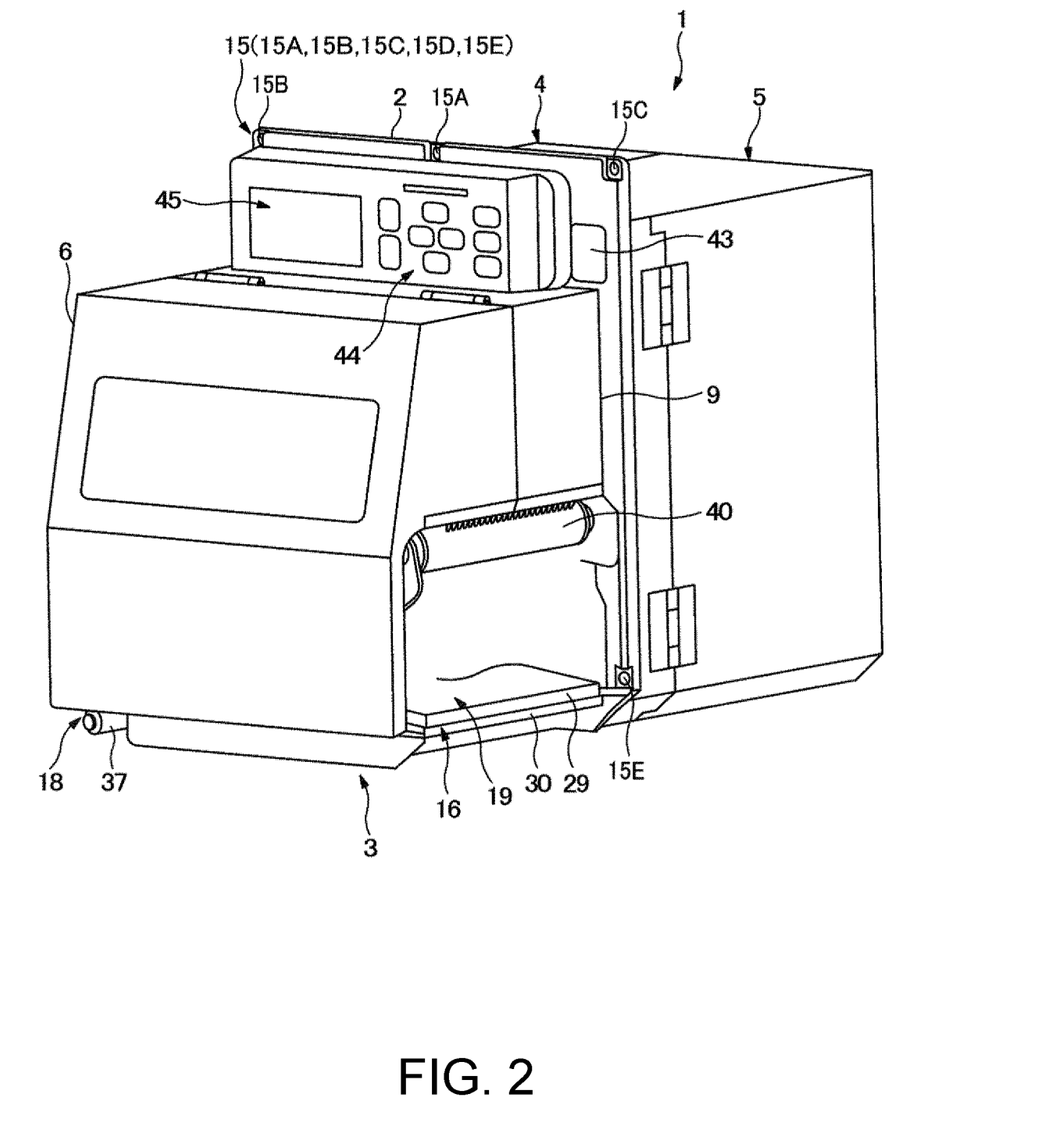
FIG. 2 is a perspective view of the printer according to the present embodiment.

FIG. 2 is a perspective view of the printer 1. As shown in FIG. 2, the printer 1 includes a central main body unit 2, a printing unit 3, a drive unit 31 (see FIG. 4) that drives the printing unit 3, a control unit 4, and a power supply unit 5.

The printing unit 3 is located on one side surface of the central main body unit 2 (a front surface of the printer 1). The drive unit 31, the control unit 4, and the power supply unit 5 are located on the other (opposite) side surface of the central main body unit 2 (a back surface of the printer 1).

The central main body unit 2 is a rectangular plate-shaped unit having a predetermined mechanical strength. The central main body unit 2 is located at a central portion of the printer 1, and the printing unit 3, the drive unit 31, the control unit 4, and the power supply unit 5 are assembled into the central main body unit 2.

A power supply switch 43, an operation portion 44 including various operation keys, a display 45, and the like are provided above a support case 9 of the central main body unit 2.

The central main body unit 2 is provided with a mounting portion 15 for mounting the printer 1 to the label attaching machine 101 (see FIGS. 1 and 4).

The mounting portion 15 may have any configuration, and is provided at a peripheral portion of the central main body unit 2 in the present embodiment. Specifically, the mounting portion 15 according to the present embodiment includes five mounting holes (an upper central mounting hole 15A, an upper left end mounting hole 15B, an upper right end mounting hole 15C, a lower left end mounting hole 15D (see FIG. 2), and a lower right end mounting hole 15E) formed in the peripheral portion of the central main body unit 2.

The drive unit 31 includes, for example, a plurality of stepping motors, and rotation operations (rotation directions, the number of steps, and the like) of the plurality of stepping motors are controlled by the control unit 4.

The power supply unit 5 receives power from the outside through an outlet and supplies the power to the control unit 4, the drive unit 31, and the printing unit 3.

Figure 3:
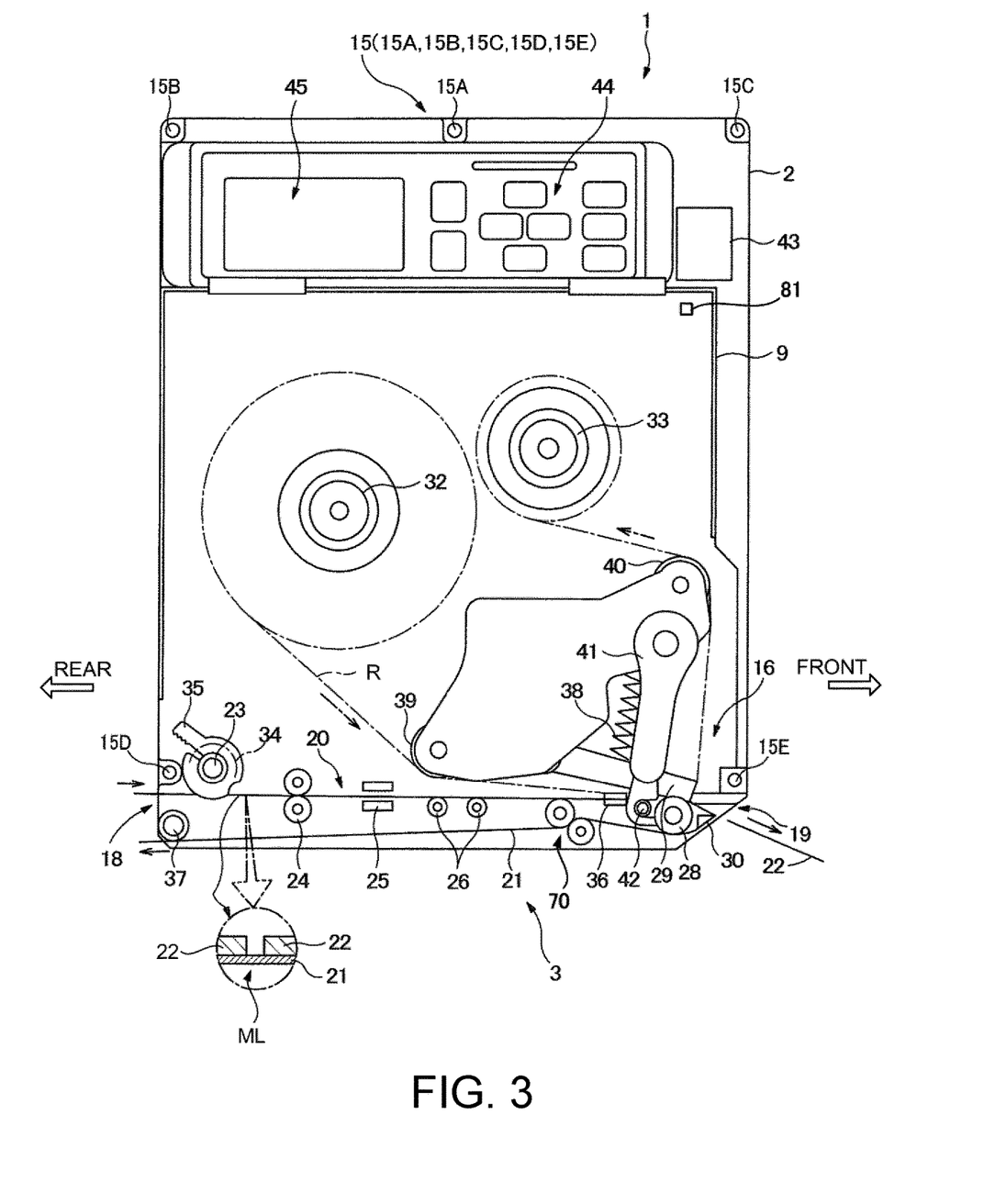
FIG. 3 is a front view of the printer from which a printing unit cover is removed.

FIG. 3 is a front view of the printer 1 from which a printing unit cover 6 (see FIG. 2) is removed.

As shown in FIG. 3, the printing unit 3 includes a printing portion 16 that performs printing on the plurality of labels 22 of the label continuous body ML.

The printing unit 3 can print predetermined information to the label 22 in a conveyance path 20 from an introduction port 18 to a eject port 19 of the label continuous body ML.

As shown in an enlarged cross section in FIG. 3, the label continuous body ML includes the strip-shaped liner sheet 21 as a continuous paper, and the plurality of labels 22 temporarily attached to a front surface side of the liner sheet 21. A position detection mark (not shown) is printed in advance on a back surface side of the liner sheet 21.

The label continuous body ML may be, for example, a roll label or a fanfold label in which perforations are formed in the liner sheet 21 at predetermined intervals.

The printing portion 16 includes a width regulating shaft 23, a pair of upper and lower auxiliary conveyance rollers 24, a position detection sensor 25, two guide rollers 26, a conveyance roller mechanism 70, a platen roller 28, a thermal head 29, and a peeling plate 30 in this order from an upstream side of the conveyance path 20 (a rear side of the printer 1).

In addition, the printing portion 16 includes a ribbon supply shaft 32 that supplies an unused thermal transfer ink ribbon R between the platen roller 28 and the thermal head 29, and a ribbon winding shaft 33 that winds up a used thermal transfer ink ribbon R.

The width regulating shaft 23 is provided with a first width regulating fixed wall portion 34 and a width regulating movable ring 35. Positions of both left and right edge portions of the label continuous body ML are regulated by the first width regulating fixed wall portion 34, the width regulating movable ring 35, and a second width regulating fixed wall portion 36 provided on an upstream side of the platen roller 28. Accordingly, a conveyance posture of the label continuous body ML is appropriately regulated along the conveyance path 20.

The auxiliary conveyance roller 24 is driven in synchronization with the platen roller 28 and assists the platen roller 28 and the thermal head 29 in conveying the label continuous body ML in forward and reverse directions. Forward feed (conveyance in the forward direction) is conveyance to a downstream side (a front side of the printer 1), and backfeed (conveyance in the reverse direction) is conveyance to the upstream side (the rear side of the printer 1).

The position detection sensor 25 can detect a relative positional relation between the label continuous body ML (the label 22), the platen roller 28, and the thermal head 29 by detecting a position detection mark of the liner sheet 21.

The conveyance roller mechanism 70 functions as a conveyance portion that conveys the label continuous body ML in both forward and reverse directions, and conveys the liner sheet 21 turned by the peeling plate 30 to the rear side of the printer 1 while nipping the liner sheet 21. The liner sheet 21 is ejected to the outside of the printer 1 via a liner sheet guide roller 37.

The platen roller 28 also functions as a conveyance roller that conveys the label continuous body ML, and nips the label continuous body ML and the thermal transfer ink ribbon R between the platen roller 28 and the thermal head 29 at a predetermined printing pressure by a pressing spring 38. In this state, heating elements of the thermal head 29 are caused to generate heat and the platen roller 28 is rotationally driven to perform the printing on the label 22. In a case where the label 22 is a thermosensitive medium that develops colors by heat, the thermal transfer ink ribbon R is unnecessary.

The thermal transfer ink ribbon R is supplied between the platen roller 28 and the thermal head 29 from the ribbon supply shaft 32 via a first ribbon guide roller 39, and is wound around by the ribbon winding shaft 33 via a second ribbon guide roller 40.

By pivoting an opening and closing lever 41 in a clockwise direction, the platen roller 28 and the thermal head 29 can be separated from each other. Accordingly, the label continuous body ML and the thermal transfer ink ribbon R can be loaded between the platen roller 28 and the thermal head 29.

When the opening and closing lever 41 is pivoted in a counterclockwise direction to engage a tip end portion of the opening and closing lever 41 with a lever engagement pin 42 mounted to a frame, the platen roller 28 and the thermal head 29 are in a printing posture shown in FIG. 2.

The peeling plate 30 turns only the liner sheet 21 of the label continuous body ML at a tip end portion of the peeling plate 30. Accordingly, the label 22 is peeled off from the liner sheet 21 and ejected (issued) from the eject port 19. The label 22 peeled off from the liner sheet 21 is transferred to the label attaching machine 101. The label attaching machine 101 attaches the label 22 received from the printer 1 to the adherend A.

The control unit 4 is implemented by a microcomputer including a central processing unit (CPU), a read-only memory (ROM), a random access memory (RAM), and an input/output interface (an I/O interface). The control unit 4 executes various processes by reading and executing programs stored in the ROM by the CPU. The control unit 4 may also be implemented by a plurality of microcomputers.

The printer 1 includes a cover sensor 81 for detecting opening and closing of the printing unit cover 6.

Hereinafter, the control unit 4 will be described in detail with reference to FIG. 4. FIG. 4 is a block diagram showing a part of functions of the control unit 4, and each block does not necessarily mean a physical configuration.

As shown in FIG. 4, the control unit 4 is communicably connected to the external computer 200 in a wired or wireless manner.

The external computer 200 is also communicably connected to the label attaching machine 101, the label feeding machine 102, and the conveyance device 103.

The control unit 4 performs the printing on the label 22 by controlling the drive unit 31 and the thermal head 29 based on printing data acquired from the external computer 200.

The control unit 4 includes a communication portion 51, a data generation portion 52, a conveyance control portion 53, a printing control portion 54, and a storage portion 55. In the present embodiment, the data generation portion 52, the conveyance control portion 53, and the printing control portion 54 are implemented by a processor 4a.

The communication portion 51 receives signals from various sensors including the position detection sensor 25, the operation portion 44, and the like.

The communication portion 51 includes a digital I/O connector 151 for sending and receiving digital input and output signals to and from the external computer 200, and a communication interface 152 for communicating with the label attaching machine 101, the label feeding machine 102, the conveyance device 103, and the like.

In the printer 1, the communication portion 51 uses the digital I/O connector 151 or the communication interface 152 to send the signal for indicating the state of the printer 1 to external devices such as the label attaching machine 101, the label feeding machine 102, and the conveyance device 103.

The communication portion 51 receives the signal for performing the operation of the printer 1 from the external devices such as the label attaching machine 101, the label feeding machine 102, and the conveyance device 103.

In the present embodiment, the "state of the printer 1" includes states detected by turning on/off various switches and sensors mounted on the printer 1, such as an open/closed state of the printing unit cover 6 and a state of the printing portion 16. Setting values set by an input to the printer 1 are included. An error occurring in the printer 1, an off-line or an on-line, the presence or absence of printing data, a remaining amount of an ink ribbon, a remaining amount of labels, and the like are included.

In the present embodiment, the "operation of the printer 1" includes turning on or off a network connection of the printer 1, conveying the label 22 before printing, cancellation of an error occurring in the printer 1, deletion of printing data, adjustment of various sensors provided in the printer 1, turning on or off light emission of a touch panel-equipped display, display of information to a touch panel-equipped display, a self-check operation of the printer 1, and the like.

An input and output portion of the digital I/O connector 151 is provided with a plurality of input and output terminals (ports). Generally, there are various standards for the number of ports of a digital I/O connector, but the printer 1, for example, supports 25-pin or 14-pin ports.

The printer 1 can assign, to the digital I/O connector 151, sending and receiving of a part of the signal for indicating the "state of the printer 1" and a part of the signal for performing the "operation of the printer 1", and can assign, to the communication interface 152, sending and receiving of the remaining signal for indicating the "state of the printer 1" and the remaining signal for performing the "operation of the printer 1".

In the present embodiment, the printer 1 can assign the part of the signal for indicating the "state of the printer 1" and the part of the signal for performing the "operation of the printer 1" described above to the plurality of ports of the digital I/O connector 151.

FIG. 5 is a diagram illustrating examples of commands respectively corresponding to the plurality of ports provided in the input and output portion of the digital I/O connector 151. FIG. 5 shows the commands corresponding to respective ports in a case of 25 pins and in a case of 14 pins.

As shown in FIG. 5, for example, "occurrence of error", "completion of backfeed", "detection of end of ink ribbon", and the like can be set as the state of the printer 1 by a combination of each of the plurality of ports provided in the input and output portion of the digital I/O connector 151 and a signal level.

For example, "reissue label with the same printing content", "start of backfeed", "when label is nearing end", "convey label", "turning on or off network connection of printer", "conveyance of label before printing", "cancellation of error occurring in printer", "deletion of printing data", "adjustment of sensor provided in printer", "turning on or off light emission of display", "display of information to display", and the like can be set as the operation of the printer 1.

In the present embodiment, the operation of the printer 1 assigned to the ports of the digital I/O connector 151 is an operation performed by an input from a user. The state of the printer 1 assigned to the ports of the digital I/O connector 151 is a state detected by various sensors provided in the printer 1.

Sending and Receiving of operations and states of the printer 1 other than those described above are assigned to the communication interface 152.

An input signal and a signal level for a predetermined number port of the digital I/O connector 151 are converted into a command (an example of a second command) for operating the printer 1, based on a table stored in the storage portion 55. A command (an example of a first command) for indicating the state of the printer 1 is converted into an output signal from a predetermined number port of the digital I/O connector 151 based on the table stored in the storage portion 55.

In the present embodiment, which port of the digital I/O connector 151 receives a signal for which operation and at what signal level, or an output signal from which port and at which signal level represents a signal for which operation is shared in advance between the printer 1 and the external devices such as the label attaching machine 101, the label feeding machine 102, and the conveyance device 103.

In the present embodiment, the communication interface 152 can use Ethernet, universal serial bus (USB), RS-232C, NFC, wireless LAN, wired LAN, or the like. When an external device that controls printing data is connected to the printer 1, an interface of a type that is not used by the external device that controls the printing data can be selected as the communication interface 152.

Commands other than the commands assigned to the ports of the digital I/O connector 151 are sent to the external devices such as the label attaching machine 101, the label feeding machine 102, and the conveyance device 103 via the communication interface 152.

The data generation portion 52 analyzes the printing data acquired from the external computer 200 via the storage portion 55 and generates control data and drawing data. The data generation portion 52 transfers the control data and the drawing data to the printing control portion 54 in order from the control data.

The control data includes a value indicating the number of steps of a pulse signal supplied to the stepping motors of the drive unit 31 during printing.

The drawing data includes a value (the number of dots) indicating a printing position for selectively energizing the heating elements of the thermal head 29 for each line during printing.

When the printing control portion 54 completes acquisition of the control data, the conveyance control portion 53 back feeds the label continuous body ML and moves the leading label 22 of the label continuous body ML to a printing start position (see FIG. 3).

The conveyance control portion 53 controls forward feed of the label continuous body ML during printing.

The conveyance control portion 53 receives, from the data generation portion 52, control data for switching the conveyance of the label continuous body ML from the backfeed to the forward feed or from the forward feed to the backfeed, and sets a switching waiting period.

Based on the control data from the data generation portion 52, the conveyance control portion 53 transfers, to the drive unit 31, a stop signal for stopping the conveyance of the label continuous body ML after the printing on the label continuous body ML ends. After the stop signal is transferred, a reverse rotation signal for starting conveyance in the reverse direction is transferred.

The printing control portion 54 acquires the control data and the drawing data from the data generation portion 52. Then, when a printing start command (a printing request) is acquired thereafter, a printing process of performing printing on the label 22 at the printing start position and moving the printed label 22 to a label issuing position is executed.

Specifically, the printing control portion 54 controls energization of the plurality of stepping motors of the drive unit 31 based on the control data, and controls energization of the thermal head 29 based on the drawing data, thereby performing the printing on the label 22 and conveying the printed label 22 to the label issuing position.

The printing start command is supplied from the external computer 200 to the control unit 4. That is, in the present embodiment, the printing control portion 54 acquires the printing start command from the external computer 200 via the communication portion 51 and the processor 4a.

When it is determined that the label attaching machine 101 is in a predetermined standby state and the printer 1 is in a printable state, the external computer 200 sends the printing start command to the control unit 4.

When the printer 1 ends the printing process, the external computer 200 supplies new printing data to the control unit 4.

The storage portion 55 stores, for example, the printing data acquired from the external computer 200, the state of the printer 1, and the like. The label attaching machine 101 and the external computer 200 can store information in the storage portion 55 via the communication portion 51.

The storage portion 55 stores a table in which each port of the digital I/O connector 151 described above is associated with a command assigned to the port.

[Program]

A program according to the present embodiment is a program executable by the external computer 200 of the printing system 100 that is connected to the external devices such as the label attaching machine 101, the label feeding machine 102, and the conveyance device 103 and operates in cooperation with these external devices. The program causes the external computer 200 to execute a procedure of sending the signal for indicating the state of the printer 1 to the external device and/or a procedure of receiving the signal for performing the operation of the printer 1 from the external device, and a procedure of displaying the state of the printer 1 in the external devices such as the label attaching machine 101, the label feeding machine 102, and the conveyance device 103 and/or a procedure of receiving an input of the operation of the printer 1 from the external devices such as the label attaching machine 101, the label feeding machine 102, and the conveyance device 103.

The program according to the present embodiment is stored in the ROM, the storage portion 55, or the like of the control unit 4 of the printer 1, and is executed by the processor 4a.

Effects

According to the printer 1 of the present embodiment, the signal for indicating the state of the printer 1 and/or the signal for performing the operation of the printer are sent to the external devices such as the label attaching machine 101, the label feeding machine 102, and the conveyance device 103. The signal for performing the operation of the printer 1 is input from the external device.

Accordingly, the state of the printer 1 can be displayed on display portions (the touch panel-equipped displays 112, 124, and 133) of the external devices such as the label attaching machine 101, the label feeding machine 102, and the conveyance device 103. The operation of the printer 1 can be input from input portions (the touch panel-equipped displays 112, 124, and 133) of the external devices.

Therefore, even when interfaces of the display portion, the input portion, and the like are provided for each device, the user can operate the printer 1 using the interfaces of any device connected to the printing system 100.

Accordingly, depending on a layout of each device in the printing system 100, even when it is difficult to arrange the display portion and the input portion of each device such that the user can handle the portions in an integrated manner, each device can be operated using the interfaces of any device, and thus it is possible to prevent a decrease in work efficiency without causing confusion to the user.

Therefore, when the printer 1 is used together with a device capable of performing a cooperative operation, it is possible to improve user convenience.

The printer 1 is provided with the digital I/O connector 151 including the plurality of input and output terminals, an output of the signal for indicating the state of the printer 1 and a signal level to be output and an input of the signal for performing the operation of the printer 1 and a signal level to be input are assigned to the plurality of ports, and commands are associated with the input and output ports.

For example, as shown in FIG. 5, when the digital I/O connector 151 has 14 pins, in the printer 1, a command for executing a process of reissuing a label with the same printing content is assigned to an input of an electric signal with a signal level of LOW to the port 7, and this process is executed.

When the digital I/O connector 151 has 25 pins, in the printer 1, a command for executing a process of back feeding a label is assigned to an input of an electrical signal with a signal level of LOW to the port 9, and this process is executed.

In a related-art printer, in a case of confirming a connection with a label attaching machine that operates in cooperation, it is necessary to actually bring the printer connected to the label attaching machine into a desired state or to actually cause an error in the printer.

For example, in a case of confirming abnormality/normality of a machine error signal, a printing head of the printer connected to the label attaching machine is brought into an open state to confirm whether an error signal can be detected in the label attaching machine. In a case of confirming a printing completion signal, it is necessary to send printing data to the printer to bring the printer into a printable state. Alternatively, for error detection work, it is necessary to use a dedicated detection device capable of generating an error signal.

On the other hand, the printer 1 according to the present embodiment sends the signal for indicating the state of the printer 1 to the external devices such as the label attaching machine 101, the label feeding machine 102, and the conveyance device 103. Alternatively, the signal for performing the operation of the printer 1 can be input from the external device.

Therefore, for example, when an information processing terminal such as a PC is connected to the label attaching machine 101 and a signal with a specific signal level is sent from the information processing terminal to a specific port of the label attaching machine 101, the label attaching machine 101 can be made to perform an operation corresponding to the state of the printer 1 even if the printer 1 is not connected to the label attaching machine 101.

In particular, according to the printer 1, it is possible to assign output ports for signals for indicating some states of the printer 1 and input ports for signals for performing some operations of the printer 1, among a plurality of "states of the printer" or "operations of the printer", to the plurality of ports of the digital I/O connector 151.

Therefore, by sending a predetermined signal to the port of the label attaching machine 101 at a predetermined signal level, the label attaching machine 101 can be made to perform the operation corresponding to the state of the printer 1.

According to the present embodiment, a display function of the printer 1 can be executed even in an external device that does not have the function.

For example, even in a case where the printer 1 has a multi-language display function or the like and the label attaching machine 101 does not have this function, for example, in a case where the printer 1 has a Portuguese display function, an error message or the like can be displayed on the display portion of the label attaching machine 101 in Portuguese.

Other Embodiments

Although the present embodiment has been described above, the above embodiment merely exemplifies one of application examples of the present invention, and does not intend to limit the technical scope of the present invention to the specific configuration of the above embodiment.

A configuration of the printing system is not limited to that shown in FIG. 1 as long as the printing system can cooperate with the printer 1.

In the present embodiment, the printer 1 is communicably connected to the external computer 200 via the digital I/O connector 151, but the printer 1 may be individually connected via the digital I/O connector 151 to the external device capable of performing a cooperative operation, such as the label attaching machine 101, the label feeding machine 102, or the conveyance device 103.

A function of the external computer 200 in the printing system 100 may be provided in the control unit 4 of the printer 1, or may be provided in a computer of the external device capable of performing the cooperative operation, such as the label attaching machine 101, the label feeding machine 102, or the conveyance device 103.

In the present embodiment, various programs of the printer 1 may be stored in a non-transitory recording medium such as a CD-ROM.

The present application claims priority under Japanese Patent Application No. 2021-212465 filed to the Japan Patent Office on Dec. 27, 2021, and the entire content of this application is incorporated herein by reference.

The invention claimed is:

1. A printing system comprising:
an attaching device configured to attach a label on an adherend; and
a printer connected to the attaching device and configured to operate in cooperation with the attaching device, wherein:
the printer is configured to send a signal for indicating a state of the printer to the attaching device, and receive a signal for performing an operation of the printer from the attaching device, and
the attaching device is configured to receive the signal from the printer indicating the state of the printer and display information indicating the state of the printer, and receive an input of the signal for performing the operation of the printer and send the signal to the printer.

2. The printing system according to claim 1, wherein:
the printer comprises an input and output portion comprising a plurality of input and output terminals, and
sending and receiving of the signal for indicating the state of the printer and the signal for performing the operation of the printer are assigned to the input and output portion.

3. The printing system according to claim 2, wherein:
a first command for indicating the state of the printer is assigned to a combination of one of the output terminals and a signal level output from said one of the output terminals, and the attaching device is configured to display the state of the printer based on the first command.

4. The printing system according to claim 3, wherein:
a second command for performing the operation of the printer is assigned to a combination of one of the input terminals and a signal level input to said one of the input terminals, and the printer is configured to perform an operation based on the second command.

5. The printing system according to claim 4, wherein:
the operation of the printer performed in response to the second command is at least one operation selected from turning on or off a network connection of the printer, conveyance of a label before printing, cancellation of an error occurring in the printer, deletion of printing data, adjustment of a sensor provided in the printer, turning on or off light emission of a display, and display of information to the display.

6. The printing system according to claim 4, wherein:
the printer is configured to send a signal for indicating the assigned combination of said one of the input terminals and the signal level input to the attaching device, or the printer is configured to receive a signal indicating the assigned combination of said one of the input terminals and the signal level input from the attaching device, in advance of the printer receiving the signal for performing an operation of the printer from the attaching device.

7. The printing system according to claim 3, wherein:
the printer is configured to send a signal for indicating the assigned combination of said one of the output terminals and the signal level output to the attaching device, or the printer is configured to receive a signal indicating the assigned combination of said one of the output terminals and the signal level output from the attaching device, in advance of the attaching device receiving the signal from the printer indicating the state of the printer.

8. The printing system according to claim 2, wherein:
a command for performing the operation of the printer is assigned to a combination of one of the input terminals and a signal level input to said one of the input terminals, and the printer is configured to perform an operation based on the command.

9. The printing system according to claim 8, wherein:
the operation of the printer performed in response to the command is at least one operation selected from turning on or off a network connection of the printer, conveyance of a label before printing, cancellation of an error occurring in the printer, deletion of printing data, adjustment of a sensor provided in the printer, turning on or off light emission of a display, and display of information to the display.

10. The printing system according to claim 8, wherein:
the printer is configured to send a signal for indicating the assigned combination of said one of the input terminals and the signal level input to the attaching device, or the printer is configured to receive a signal indicating the assigned combination of said one of the input terminals and the signal level input from the attaching device, in advance of the printer receiving the signal for performing an operation of the printer from the attaching device.

11. The printing system according to claim 2, wherein:
the input and output terminals are digital in/out connectors.

12. A control method for a printing system, the printing system comprising a printer that is connected to an attaching device configured to attach a label to an adherend, wherein the printer is configured to operate in cooperation with the attaching device, the method comprising:
sending, by the printer, a signal for indicating a state of the printer to the attaching device, and receiving, by the printer, a signal for performing an operation of the printer from the attaching device; and
displaying, by the attaching device, the state of the printer, and receiving, by the attaching device, an input of the operation of the printer.

13. A printer that is configured to connect to an attaching device configured to attach a label to an adherend, the printer being configured to operate in cooperation with the attaching device, the printer comprising:
a control unit configured to:
send a signal for indicating a state of the printer to the attaching device, and
receive a signal for performing an operation of the printer is received from the attaching device.

14. A non-transitory computer-readable storage medium including a program executable by a computer of a printing system, the printing system comprising an attaching device configured to attach a label on an adherend and a printer connected to the attaching device and configured to operate in cooperation with the attaching device, the program causing the computer to execute operations comprising:
sending a signal for indicating a state of the printer to the attaching device, and receiving a signal for performing an operation of the printer from the attaching device; and
displaying the state of the printer, and receiving an input of the operation of the printer at the attaching device.

* * * * *